(12) United States Patent
Rolf

(10) Patent No.: US 7,729,985 B1
(45) Date of Patent: Jun. 1, 2010

(54) METHOD FOR ENABLING AN ONLINE SOCIAL COMMUNITY ACCOUNT FOR BANKING SERVICES

(75) Inventor: Devon A. Rolf, Paola, KS (US)

(73) Assignee: GoFigure Payments, LLC, Paola, KS (US)

( * ) Notice: Subject to any disclaimer, the term of this patent is extended or adjusted under 35 U.S.C. 154(b) by 180 days.

(21) Appl. No.: 11/485,699

(22) Filed: Jul. 13, 2006

(51) Int. Cl.
*G06Q 40/00* (2006.01)
(52) U.S. Cl. .................................................... 705/39
(58) Field of Classification Search ............. 705/30–45, 705/10, 14.1, 14.2, 26, 27; 455/73, 406, 455/408; 463/25, 29, 43; 709/206; 713/2; 725/110, 2
See application file for complete search history.

(56) References Cited

U.S. PATENT DOCUMENTS

| | | | |
|---|---|---|---|
| 5,559,895 A | 9/1996 | Lee et al. | |
| 5,806,045 A | 9/1998 | Biorge et al. | |
| 5,870,722 A | 2/1999 | Albert et al. | |
| 5,987,429 A | 11/1999 | Maritzen et al. | |
| 5,992,738 A | 11/1999 | Matsumoto et al. | |
| 6,038,552 A | 3/2000 | Fleischl et al. | |
| 6,119,106 A | 9/2000 | Mersky et al. | |
| 6,233,568 B1 | 5/2001 | Kara | |
| 6,347,305 B1* | 2/2002 | Watkins | 705/26 |
| 6,829,588 B1* | 12/2004 | Stoutenburg et al. | 705/30 |
| 6,876,979 B2 | 4/2005 | Ling | |
| 7,089,208 B1 | 8/2006 | Levchin et al. | |
| 7,376,583 B1 | 5/2008 | Rolf | |
| 2002/0065784 A1* | 5/2002 | Ranzini et al. | 705/64 |
| 2002/0152160 A1 | 10/2002 | Allen-Rouman et al. | |
| 2002/0152168 A1 | 10/2002 | Neofytides et al. | |
| 2003/0004868 A1 | 1/2003 | Early et al. | |
| 2003/0144942 A1 | 7/2003 | Sobek | |
| 2004/0033797 A1 | 2/2004 | Raivisto et al. | |
| 2004/0039694 A1 | 2/2004 | Dunn et al. | |
| 2004/0111361 A1* | 6/2004 | Griffiths et al. | 705/39 |
| 2004/0111370 A1* | 6/2004 | Saylors et al. | 705/40 |
| 2004/0193691 A1* | 9/2004 | Chang | 709/206 |
| 2004/0225545 A1* | 11/2004 | Turner et al. | 705/8 |
| 2005/0027700 A1 | 2/2005 | Turner et al. | |
| 2005/0033691 A1 | 2/2005 | Whewell et al. | |
| 2005/0037731 A1 | 2/2005 | Whewell et al. | |

(Continued)

OTHER PUBLICATIONS

Social networks and economic sociology: A proposed research agenda for a more complete social science, Davern, Michael, American Journal of Economics & Sociology v56n3 pp: 287-302, Jul. 1997.*

(Continued)

*Primary Examiner*—James P Trammell
*Assistant Examiner*—Tien C Nguyen
(74) *Attorney, Agent, or Firm*—Hovey Williams LLP

(57) ABSTRACT

A system and method for depositing salary payments directly into an account that is associated with at least one of a communications service and an Internet feature, such as auction, search, communication, hosting, social community, content aggregation, media downloading or streaming, whereafter the deposited money is available to be used in electronic commerce or to be otherwise withdrawn. The account may be maintained either by a communication service provider associated with the account or by a financial service provider (e.g., a bank) in partnership with a provider of communications and/or Internet services or with the ability to support such communications/Internet offerings.

16 Claims, 2 Drawing Sheets

U.S. PATENT DOCUMENTS

| | | | |
|---|---|---|---|
| 2005/0044018 A1 | 2/2005 | Whewell | |
| 2005/0149416 A1 | 7/2005 | Benco et al. | |
| 2006/0026099 A1 | 2/2006 | Danz et al. | |
| 2006/0085259 A1* | 4/2006 | Nicholas et al. | 705/14 |
| 2006/0129504 A1 | 6/2006 | Nakajima | |
| 2006/0212393 A1* | 9/2006 | Nicholas et al. | 705/40 |
| 2006/0224477 A1* | 10/2006 | Garcia et al. | 705/32 |
| 2006/0248015 A1 | 11/2006 | Baartman et al. | |
| 2006/0294025 A1 | 12/2006 | Mengerink | |
| 2007/0022214 A1 | 1/2007 | Harcourt | |
| 2007/0162458 A1* | 7/2007 | Fasciano | 707/10 |
| 2007/0208627 A1* | 9/2007 | Abadi | 705/26 |
| 2007/0287413 A1 | 12/2007 | Kleitsch et al. | |
| 2008/0195498 A1 | 8/2008 | Crawford et al. | |

OTHER PUBLICATIONS

System and Method for Using Social Networks to Facilitate Business Processes, Visible Path Corporation, 56 West 22nd Street, New York, NY 10010, US, Jul. 28, 2004.*

Non-Final Office Action dated May 13, 2008 in U.S. Appl. No. 11/485,700, filed Jul. 13, 2006; Inventor: Rolf, Devon.

Amendment dated Nov. 13, 2008 in response to Non-Final Office Action dated May 13, 2008 in U.S. Appl. No. 11/485,700, filed Jul. 13, 2006; Inventor: Rolf, Devon.

Non-Final Office Action dated May 13, 2008 in U.S. Appl. No. 11/485,719, filed Jul. 13, 2006; Inventor: Rolf, Devon.

Amendment dated Nov. 13, 2008 in response to Non-Final Office Action dated May 13, 2008 in U.S. Appl. No. 11/485,719, filed Jul. 13, 2006; Inventor: Rolf, Devon.

U.S. Appl. No. 11/485,700, filed Jul. 13, 2006 (spec and claims as filed).

U.S. Appl. No. 11/485,719, filed, Jul. 13, 2006 (spec and claims as filed).

Toward The Single Account; United States Banker, Company/Corporate Profile/Review; Dec. 16, 1974, pp. 5-6.

* cited by examiner

METHOD FOR ENABLING AN ONLINE SOCIAL COMMUNITY ACCOUNT FOR BANKING SERVICES

BACKGROUND OF THE INVENTION

Field of the Invention

The present invention relates to systems and methods for depositing salary payments directly into an account associated with another type of account or service, such as a communications services, media aggregation services, or Internet auction, advertising, search, portal or access services, whereafter the deposited money may be spent via a spending device or otherwise withdrawn.

SUMMARY OF THE INVENTION

The present invention provides a system and method for depositing salary payments directly into an account that operates like a banking debit account but also either services another function (other than a banking type of account) or is associated with a second account that is at least one of a communications account, an online social community account, or an account that provides Internet services, such as media or content aggregation, auction services, advertising services, search services, or access services. As such, the invention provides a tool for communications and Internet companies to become banks and to receive deposits.

In one embodiment of the invention, various parties are involved, such as a communication service or Internet service provider and a financial service provider. In exemplary use and operation in such an embodiment, an agreement is formed between the communication or Internet company or the financial service provider one the one hand and a payor on the other hand regarding the direct deposit of salary payments into the unique account of the present invention. Sometime thereafter, a user requests that his or her salary payment be directly deposited into the newly formed account. Incentives may be provided to the payor and/or user for establishing the direct deposit. Subsequently, whenever a salary payment is made, it is deposited by the payor directly into the, whereafter it is available to the user to be used in commerce or to be otherwise withdrawn. Such commerce and withdrawals can be done in conventional fashion, such as with card 13, or may include mobile commerce, for example, such as by using the personal communication device 12. Fees may be charged for the user's subscription to or usage of the mobile commerce feature, and all or a portion of any such fees may be shared between the communication and financial service providers.

In an alternate embodiment, a single entity (or a single family of entities) provides both banking services and communications or Internet services. The entity provides account services into which money may be deposited, including particularly using a direct pay feature in which a payee's employer deposits pay electronically into a payee's account. The account also serves as at least one of an account for accessing the Internet, an account for buying or subscribing to media, an account for tracking Internet search results (or, as in the case of a merchant) for tracking Internet advertising expenditures, an account for accessing an online auction, an online social community account, and a communications account (such as a cellular account, a cable, telephone, or satellite account, including but not limited to an account involving VOIP and/or using wide area networks or local area networks of a variety of wired and wireless types).

Thus, it will be understood and appreciated that the present invention provides a number of substantial advantages over the prior art including, for example, allowing for direct deposits into a communications or Internet account. Incentives may be provided to employers or other payors and to users in order to increase participation in the use of commerce. For example, fees or prices ordinarily charged for services and products may be reduced or altogether eliminated if a balance (such as an average daily balance) remains above a particular threshold for a defined period. Such increased convenience and efficiency along with participation incentives may result in increased revenue in the form of membership and/or fixed or variable usage fees paid to the provider(s).

BRIEF DESCRIPTION OF THE DRAWINGS

A preferred embodiment of the present invention is described in detail below with reference to the attached drawing figures, wherein.

DETAILED DESCRIPTION OF THE PREFERRED EMBODIMENTS

With reference to the figures, a system 10 and method are herein described, shown, and otherwise disclosed in accordance with the preferred embodiments of the present invention. Broadly, the system 10 and method allow for depositing salary payments directly into an account that serves as, or is associated with, a communication or Internet service, whereafter the deposited money is available to be used in commerce or to be otherwise withdrawn. The account may be maintained either by a communication or Internet service provider associated or by a financial service provider (e.g., a bank) with the ability to provide communications or Internet services or, for example, by one of a communications or Internet service provider and a financial service provider who have formed a business relationship pertaining to such an offering.

Figure 1:
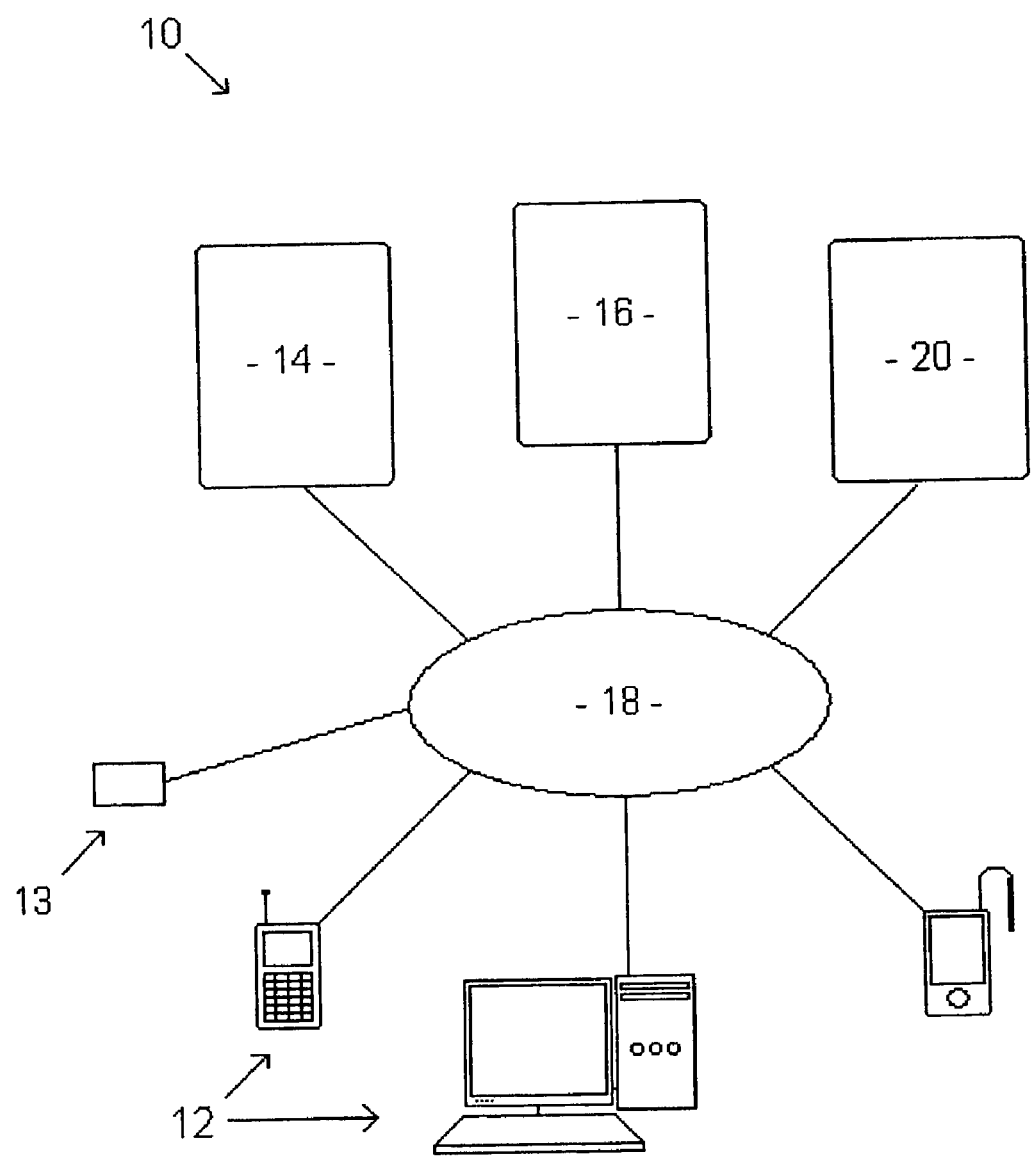
FIG. 1 is a system diagram of a preferred embodiment of the system of the present invention.

With reference to FIG. 1, the system 10 of the present invention is illustrated and described primarily in conjunction with a provider of mobile wireless communications. However, it will be understood that this is simply an exemplary embodiment, and that in place of a communication service provider, a provider of other types of electronic-based services, such as other telecommunications services, cable services, Internet services (including, but not limited to, auction services, search services, content services, advertising services, auction services, media provision, hosting, social community provision, and/or portal features) could be substituted. As illustrated, system 10 comprises a personal electronic communication device 12 or card 13; a communication/Internet service provider 14; a financial service provider 16; and a communication network 18. A payor 20, which is likely an employer of the user, is also depicted. The personal communication device 12, through which remote access to the account may be made, may be any suitable wired or wireless device, such as, for example, a cellular telephone, personal digital assistant, or computer, an Internet-enabled television, or a device combining one or more capabilities thereof.

It should be understood and appreciated that the communication services associated with the device 12 and provided by the communication/Internet service provider 14 in conjunction with the account may include, for example, one or more of a telephone service, a voice and/or data communications service, VOIP, a wireless communications service, a broadband service, and/or Internet services and/or features, such as those previously indicated. Similarly, the financial services associated with the device 12 and provided by the financial service provider 16 may include banking services such as, for example, one or more of a savings, checking, debit, and credit account. Alternatively, the banking services may be provided by the provider 14 or an affiliate entity. Furthermore, the user may be allowed to choose his or her preferred communication or financial service providers from among a plurality of different providers for each service, and to choose desired services from among different services offered. Additionally, as mentioned, the mobile commerce account may be maintained by the communication/Internet service provider 14 or by the financial service provider 16. In the former case, the financial service provider may be eliminated altogether from the system 10 and from implementation of the present invention. The present invention is therefore substantially independent of any specific details regarding actual implementation of the commerce feature itself, since electronic commerce with payment accounts are well-known. Instead, the present invention, as mentioned, is concerned primarily with the advantageous feature of allowing for the direct deposit of salary payments into an account that also serves a communications or Internet purpose or is associated with an account that serves a communications or Internet purpose.

The communication network 18 allows for and facilitates communication and information exchange between the device 12 or payment card 13, the service providers 14,16, and the payor 20, and may be, for example, the Internet or any LAN, WAN, or other network or combination of networks which use any of a wide variety of communication technologies, including wireless, hard-wired, optical, land line, or Blue Tooth.

It is also contemplated that incentives, including financial incentives, may be given to the payor 20 for allowing or even encouraging direct deposits into the account, or to the user for requesting that his or her salary payments be deposited into the mobile commerce account. Such incentives may be made possible, in part or in whole, by fees received by the communication/Internet service provider 14 or financial service provider 16, including fees shared between the providers, for the user's subscription to or use of the mobile commerce feature. Such fees may include, for example, membership fees and fixed or variable usage fees.

Figure 2:
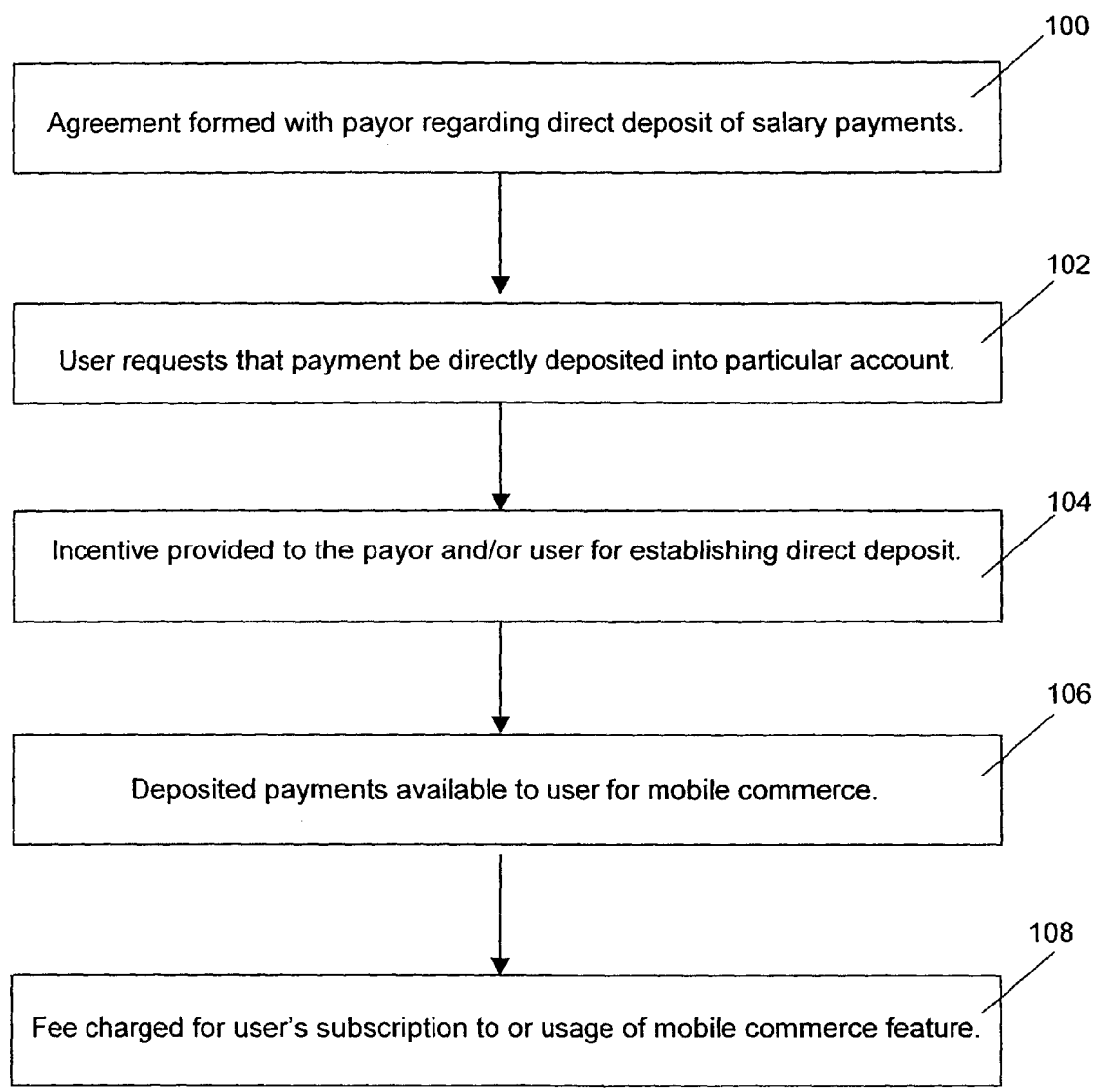
FIG. 2 is a flowchart of a preferred embodiment of the method of the present invention.

Referring also to FIG. 2, exemplary use and operation of the system 10 of the present invention proceeds as follows. This example assumes that the account is maintained by the financial service provider 16 rather than the communication/Internet service provider 14, but, as mentioned, this need not be the case and, in fact, if the communication/Internet service provider 14 maintains the account then the financial service provider 16 could be eliminated altogether from the system 10 and from implementation of the present invention.

First, an agreement is formed between the financial service provider 16 and the payor 20 regarding the direct deposit of salary payments into accounts generally, as depicted in box 100. Sometime thereafter, the user requests that his or her salary payment be directly deposited into a particular account, as depicted in box 102. The account, depicted in this illustration as a mobile commerce account, may be an existing account or may be newly established either prior to the user's request of the payor 20 or concurrently therewith (in which case the payor 20 may be instrumental in establishing the account for the user with the financial service provider 16). As mentioned, incentives may be provided to the payor 20 and/or user for establishing the direct deposit, as depicted in box 104. Subsequently, whenever a salary payment is made, it is deposited by the payor 20 directly into the commerce account, whereafter it is available to the user to be used in mobile commerce or to be otherwise withdrawn, as depicted in box 106, using the personal communication device 12 or the card 13 (or in other manners, such as checks or by making a withdrawal at an affiliated retail banking location). As mentioned, fees may be charged for the user's subscription to or usage of the commerce feature, as depicted in box 108. All or a portion of any such fees may be shared between the communication and financial service providers 14,16.

From the preceding discussion, it will be understood and appreciated that the present invention provides a number of substantial advantages over the prior art including, for example, allowing for direct deposits into a communications and/or Internet account. Incentives may be provided to employers or other payors and to users in order to increase participation. Such increased convenience and efficiency along with participation incentives may result in increased revenue in the form of membership and/or fixed or variable usage fees paid to the communication and financial service providers.

From the foregoing, it will be seen that this invention is one well adapted to attain any and all ends and objects hereinabove set forth together with the other advantages which are obvious and which are inherent.

It will be understood that certain features and subcombinations are of utility and may be employed with reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A computer-implemented method for providing an account to an accountholder, said method comprising:
   providing an account to an accountholder, wherein said account serves as a common account for accessing and using deposit services and online social community Internet services provided by a provider, wherein said providing said account to an accountholder that serves as a common account for accessing and using deposit services and online social community Internet services provided by the provider is performed by at least one electronic processor that is associated with the provider of said online social community Internet services;
   receiving a deposit in said account, wherein said deposit comprises a payment to the accountholder from a payor that is not the accountholder and said deposit is deposited into said account by the payor of said payment to said accountholder, wherein receiving said deposit of said payment to the accountholder in said account is performed by at least one electronic processor;
   enabling commerce in the form of a purchase to be conducted with said account,
   wherein the purchase in commerce is from an entity which is not the provider of the deposit or online social community Internet services,
   wherein a payment for the purchase in commerce is withdrawn from the account, and wherein said enabling commerce to be conducted with said account is performed by at least one electronic processor; and enabling withdrawal to the accountholder of money deposited in said account from said account, wherein said enabling withdrawal of money deposited in said account from said account is performed by at least one electronic processor, wherein said enabling withdrawal of money deposited in said account from said account comprises enabling withdrawal of money from said account at a retail location.

2. The method as set forth in claim 1, wherein the payor is an employer of the accountholder.

3. The method as set forth in claim 1, wherein an incentive is provided to the payor for making the direct deposit of the payment.

4. The method as set forth in claim 1, wherein the account is a commercial account.

5. The method as set forth in claim 1, wherein the account is a savings account.

6. The method as set forth in claim 1, wherein the account is a checking account.

7. The method as set forth in claim 1, wherein the account is a debit account.

8. The method as set forth in claim 1, wherein said payment is a salary payment.

9. The method as set forth in claim 1, wherein the payment for the purchase in commerce is initiated by the accountholder using a portable physical payment device that is personal to the accountholder.

10. The method as set forth in claim 9, wherein the portable physical payment device is a mobile communications device.

11. The method as set forth in claim 9, wherein the portable physical payment device is a check.

12. The method as set forth in claim 9, wherein the portable physical payment device is a payment card.

13. The method as set forth in claim 9, further comprising enabling said account to provide purchase of media or subscriptions to media.

14. The method as set forth in claim 13, wherein the portable physical payment device is a mobile communications device.

15. The method as set forth in claim 13, wherein the portable physical payment device is a check.

16. The method as set forth in claim 13, wherein the portable physical payment device is a payment card.

\* \* \* \* \*